June 14, 1927.
R. T. HAZELTON
SHAPER
Filed Aug. 25, 1924
1,632,375
5 Sheets-Sheet 3
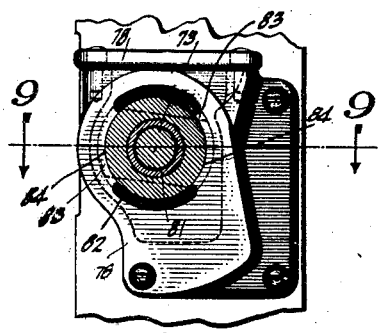
Fig.8
Fig.9
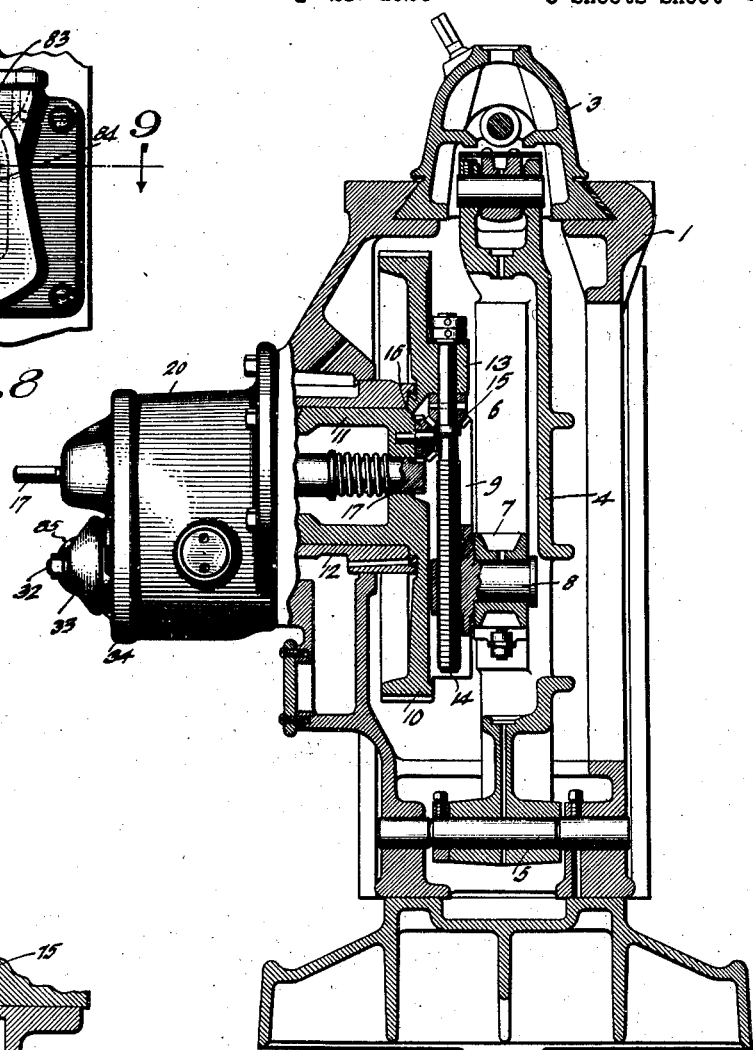
Fig.10
Inventor
Robert T. Hazelton
By
Attorneys June 14, 1927.  R. T. HAZELTON  1,632,375
SHAPER
Filed Aug. 25, 1924   5 Sheets-Sheet 4
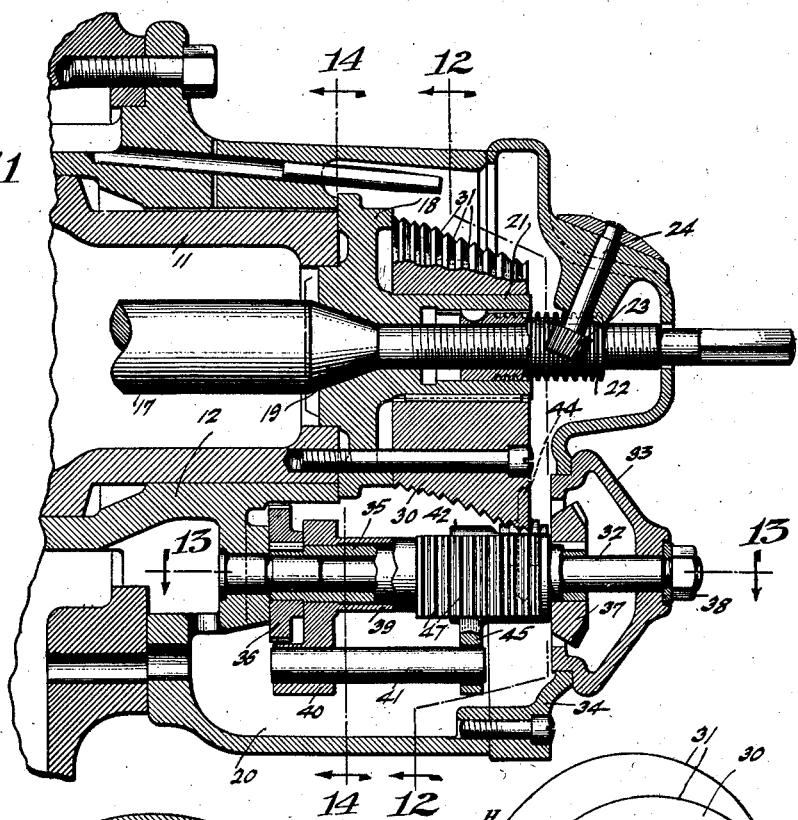
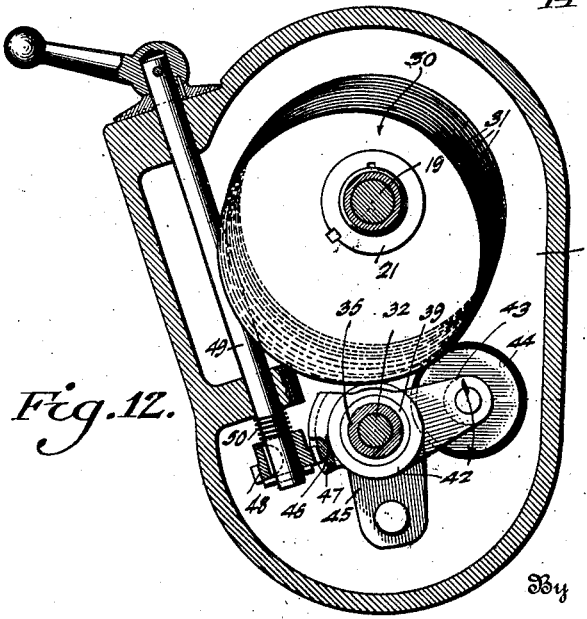
Inventor
Robert T. Hazelton
By
Attorneys

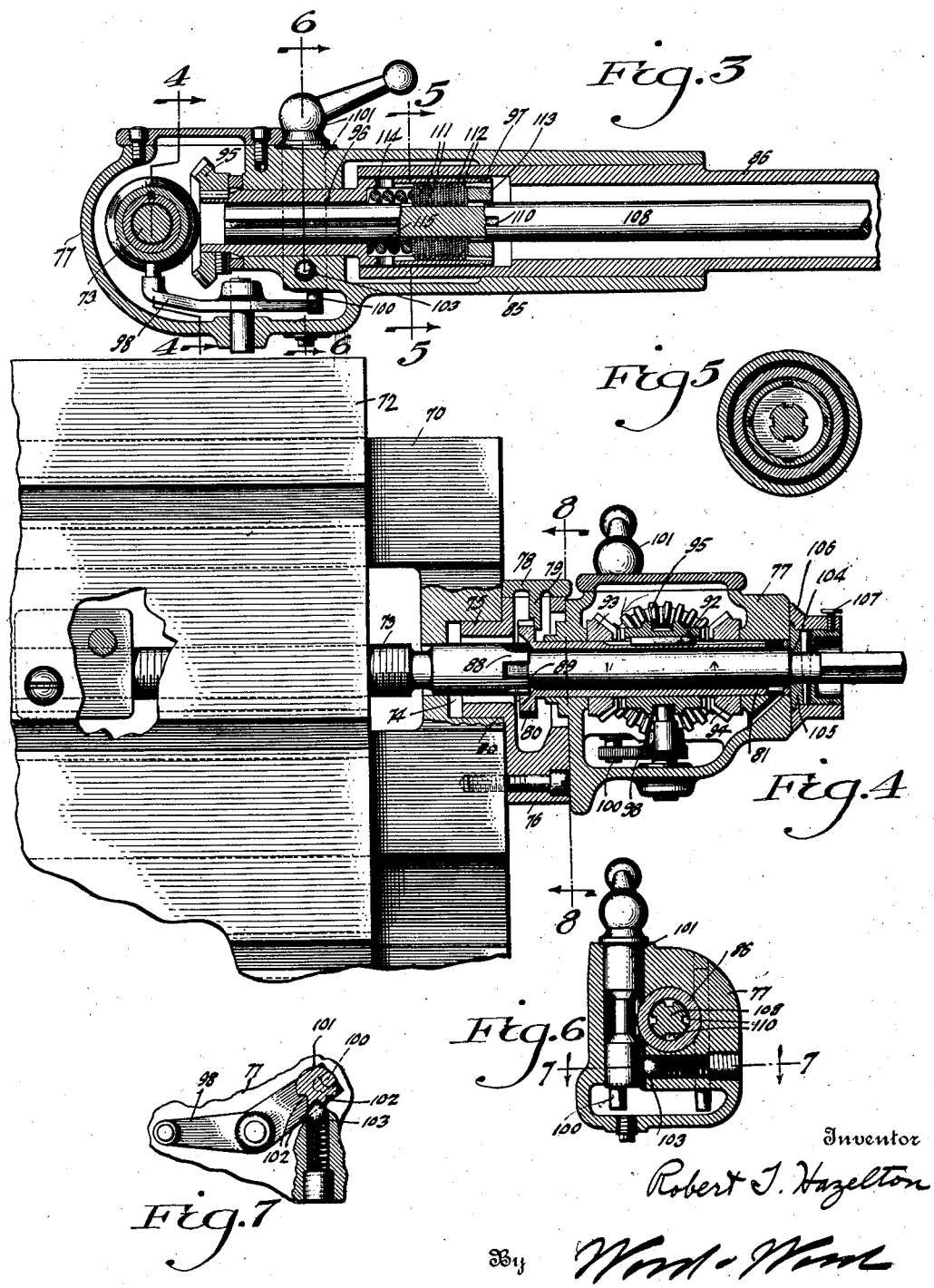

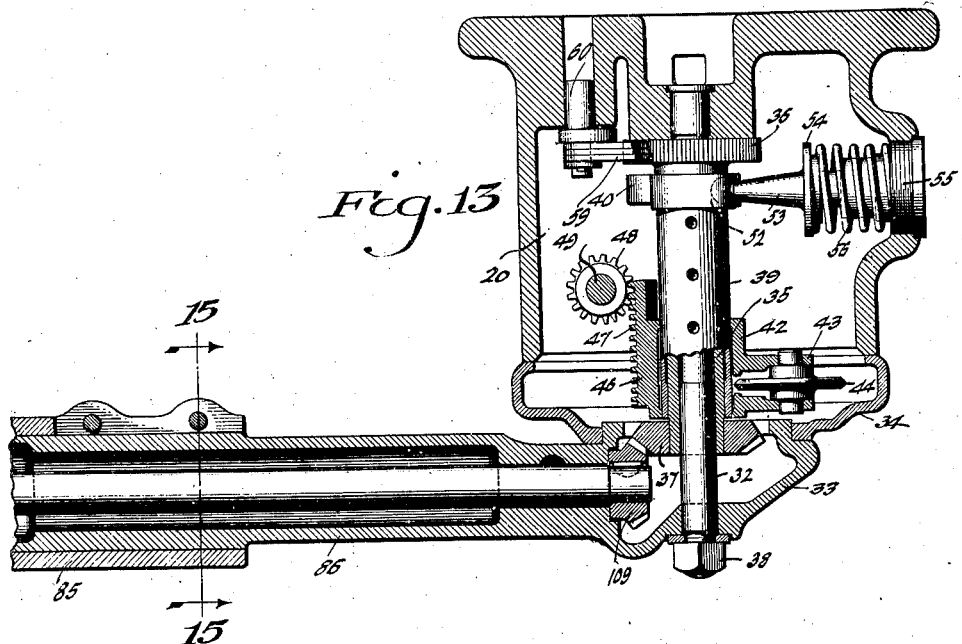
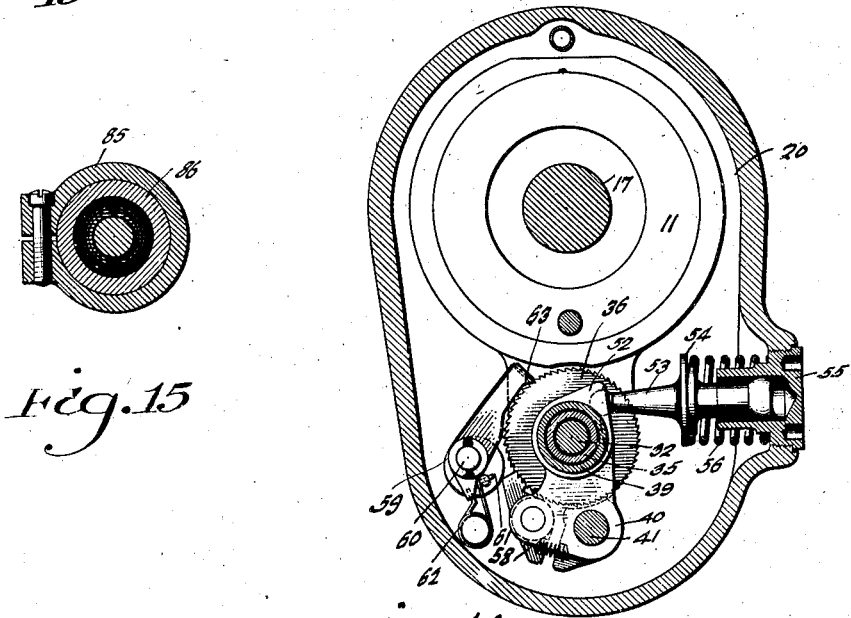

Patented June 14, 1927.

1,632,375

UNITED STATES PATENT OFFICE.

ROBERT T. HAZELTON, OF CLEVELAND, OHIO, ASSIGNOR TO THE CINCINNATI SHAPER COMPANY, OF CINCINNATI, OHIO, A CORPORATION OF OHIO.

SHAPER.

Application filed August 25, 1924. Serial No. 733,883.

This invention relates to improvements in metal working machines and is particularly directed to improvements in metal shapers, a general object of the invention being to provide improved carriage feed transmission mechanism, in which the rotary motion of the bull gear shaft is converted into intermittent, reversible, rotary motion of the cross-feed shaft of the carriage in synchronism with the ram.

In a machine of the above character, a ratchet mechanism is usually employed for intermittently rotating the carriage cross-feed shaft in forward or reverse directions, and this mechanism is usually driven by a shaft transmittably connected with the bull gear shaft. Moreover, the work holding carriage is ordinarily fed during the retreat or non-cutting stroke of the ram and it is therefore necessary that the carriage feed movement be coordinated to that of the ram, in either direction of movement, and that the proper degree or length of carriage motion be determined and regulated, preferably while the machine is in motion to obtain the proper relation between tool and work.

The carriage in this type of a machine is ordinarily vertically adjustable, which makes it necessary that the transmission connection between the carriage and crank gear, at some point, be flexible or extensible to properly maintain the driving connection at all levels of the carriage work support.

A feature of the invention of general application is the provision of the mechanism for converting continuous rotary into intermittent motion in reverse directions, the invention herein being particularly adaptable for properly rotating a feed screw of a machine of the metal shaping class.

Another object of the invention is to provide simple and efficient transmission means including feed reversing mechanism for the work table, accessible and controllable from the front or work side of the machine, the reversing portion only of the mechanism being mounted upon and movable with the table rail.

An important feature is to mount the feed change mechanism proper on the shaper body instead of on the movable saddle or carriage.

An important feature of the invention is the provision of a cam as part of the means for regulating the operating interval of the feed screw through its ratchet feed mechanism in forward and reverse directions for regulating the distance of carriage feed as well as the interval between feed rotation of the carriage cross-feed shaft. The cam herein is designed to procure feeding action only during the return stroke of the ram and wholly within that stroke thus eliminating shocks to the mechanism which are usual in other mechanisms now in use.

The important feature is the provision of a multiple path cam for obtaining variation without varying the lever arm lengths or restricting the return movement of roller engaging cams as heretofore practiced. The use of such a cam provides positive means, in conjunction with intermittently operable ratchet and transmission mechanism, for obtaining a feed movement of the carriage coordinate with the return or retreat stroke of the ram, to procure the proper synchronism between the ram and table movement. The use of a cam also obtains smoother action, avoiding jerky motion or shocks to the mechanism as a whole.

Another important feature of the invention consists in pivoting the ratchet portion of the transmission mechanism upon the body of the machine adjacent to and at a point other than the crank wheel center so that the relationship of the cam with the engaging roller of the ratchet mechanism is not disturbed when the carriage is raised and lowered.

Other features of the invention are the unitary assembly of the telescopic members of the transmission system including the reversing gearing housing formed integral with one of the members and the gear housing integral with the other telescopic member, as well as the manner of detachably swivelling the said gear housing and detachably coupling and swivelling the reversing gear housing to its companion housing, which in turn is detachably secured to the rail, whereby the transmission assembly as a unit can be conveniently detached or replaced; whereby each housing is rotatable in its respective bearing or mounting to permit compensative movement when the carriage is raised and lowered; and whereby the unit may be removed from or assembled upon the machine in an axial direction.

Other objects and certain advantages will be more fully set forth in the description of the accompanying drawings forming a part of this specification, in which:

Figure 3 is a vertical longitudinal section on line 3—3, of Fig. 1.

Figure 4 is a vertical section on line 4—4, of Fig. 3, illustrating the reversing mechanism and the relation thereof to the cross-feed screw.

Figure 5 is a detail transverse section on line 5—5, of Fig. 3, illustrating the clutch.

Figure 6 is a vertical section on line 6—6, of Fig. 3, illustrating the reversing mechanism operating shaft.

Figure 7 is a plan section on line 7—7, of Fig. 6, illustrating the construction and action of the reversing gear shifting lever.

Figure 8 is a vertical section on line 8—8 of Fig. 4, illustrating the manner of rotatably detachably locking the reversing gearing housing to the rail.

Figure 9 is a plan section on line 9—9, of Fig. 8, further illustrating this construction.

Figure 10 is a vertical section through the shaper body illustrating the ram operating mechanism and stroke adjusting mechanism associated therewith.

Figure 11 is a vertical sectional view on line 11—11, of Fig. 1, illustrating the application of multiple path cam and ratchet mechanism associated therewith for regulating the cross-feed.

Figure 12 is a vertical section substantially on line 12—12, of Fig. 11, showing the relation of the feed rack relative to the cam and the means for translating the rack.

Figure 13 is a plan section on line 13—13 of Fig. 11, illustrating the feed rack and portion of the transmission mechanism connecting the same with the reversing mechanism mounted upon the carriage.

Figure 14 is a vertical section on line 14—14, of Fig. 11, illustrating the ratchet mechanism operated by the feed rack for driving the reversing gear shaft.

Figure 15 is a detail section on line 15—15, of Fig. 13, illustrating the telescopic connection between the housings pivotally held respectively on the rail and crank hub casing.

Figure 16 is a diagrammatic view showing the contours and relation of contours of two of the multiple cam grooves, in relation to the feed rack roller.

Figure 1:
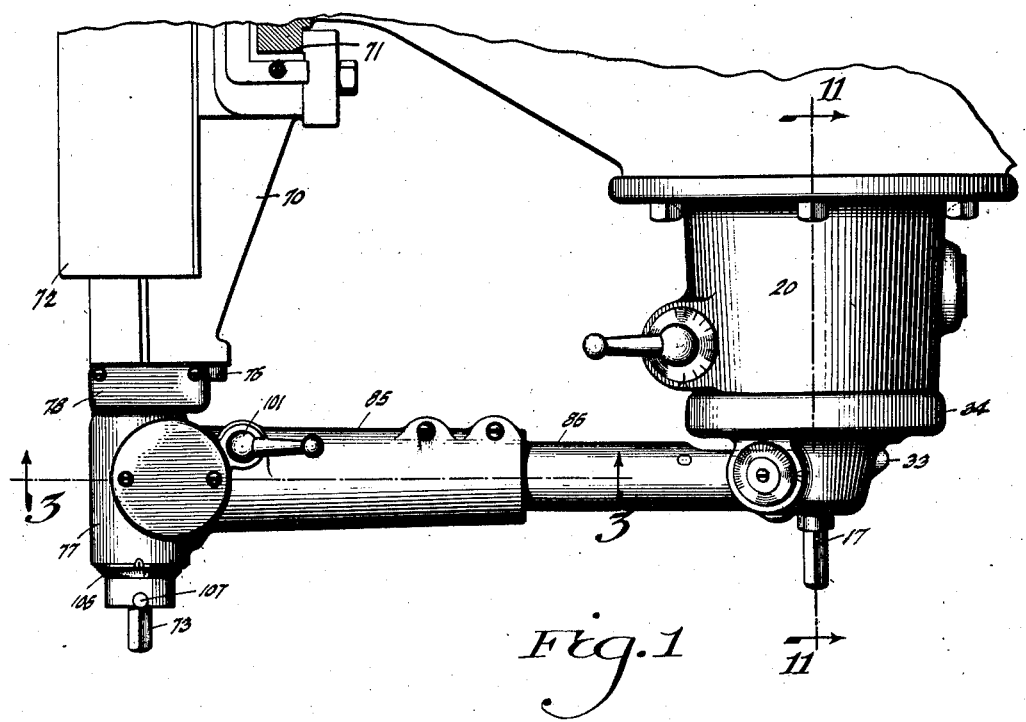
Figure 1 is a plan view of a portion of a metal shaper including the saddle and work table thereon, showing one application of my invention.
Figure 2:
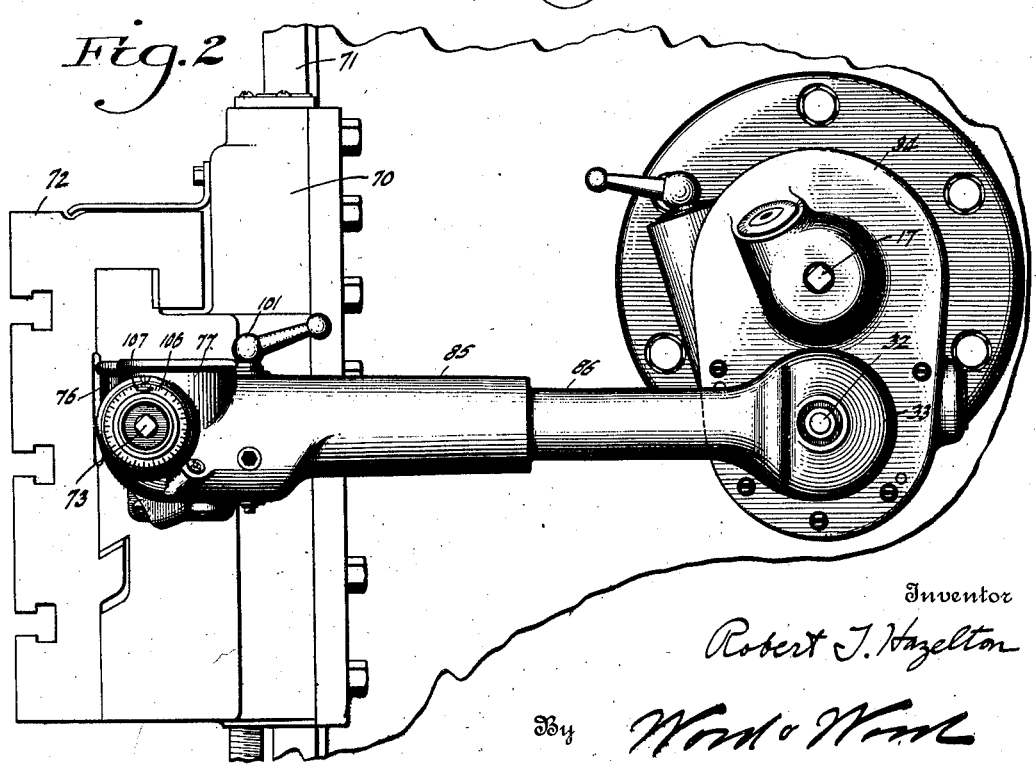
Figure 2 is a side elevation.

Inasmuch as the invention relates particularly to the transmission connection between the hub of the crank gear and the carriage cross-feed screw, no view of a shaper in its entirety is herein shown. Figure 10, however, is a cross section of a shaper taken through the crank gear and showing the crank gear and crank gear connection with the pitman, as well as the connection of the pitman with the ram.

Referring to the drawings, the numeral 1 generally indicates the frame of the machine which is mounted on a suitable base, the upper side of the frame being provided with the usual dovetail guideway with which the ram 3 reciprocates in the ordinary manner. The forward end of the ram is equipped with a tool holder, not shown herein, and the ram is reciprocated by a pitman 4 pivoted at its lower end on a suitable shaft 5 engaged in bearings of the frame. The upper end of the pitman is connected with the ram by a suitable link the details of the connection not being herein shown.

The pitman herein has the form of a casting and provides a longitudinally recessed portion open at one side, the opposing walls 6 of which provide a guide for the crank pin block 7 mounted for oscillation upon the crank pin 8 which in turn is slidably mounted within guides 9 integral with the crank or bull gear 10. The crank gear has a tubular counterturned portion or hub 11 extending from one side thereof and journaled in the bearing sleeve 12 held non-rotatably and removably at one side of the main frame beyond which it projects, a lateral projection being provided in the frame for this purpose. The crank pin guideway is formed by a pair of spaced ribs terminating in a web or lug 13 forming a bearing for supporting and journaling one end of a diametrically disposed crank pin adjusting screw 14. The screw is rotatable in its bearing and is held from longitudinal motion by suitable collars and a bevel gear 15, the collars and gear being pinned to the shaft at relatively opposite sides of the web or lug 13. The screw rod has threaded engagement with the crank pin block 7 engaged in the guideways of the gear.

When the gear is rotated the pitman is oscillated in the usual manner, the degree of oscillation or length of the ram stroke being adjusted in the following manner:

The bevel pinion 15 is in mesh with an intermediate pinion 16 journaled on a stub shaft carried by a gear 10 adjacent the center and this pinion has in addition to bevel teeth, spur teeth meshing with corresponding spur teeth upon the end of the spindle 17 which is concentrically journaled within the crank gear hub and extends outwardly as shown in Figs. 10 and 11. The forward end of the spindle is journaled in a hub cap 18, (see Fig. 11), removably attached at the outer end of the hub. The spindle is provided intermediate its ends with a conical portion 19 frictionally engageable with a corresponding seat in the hub cap for the purpose of normally, yieldably, frictionally holding or clutching the spindle for rotation with the hub but against independent rotation, a spring being provided for holding the spindle in seated position.

The crank gear hub extension 11 is rotatable in the removable bearing housing 12 held in the machine frame, and hub and housing extend beyond the frame at one side. (See Fig. 11). The outermost extended part of the housing provides a chamber 20 projecting beyond the end of the hub wherein are housed certain parts of the feed mechanism including the multiple cam block and the cam operated ratchet feed and transmission mechanism. The cap 18 engaged with the outer end of the tubular crank gear hub has a tubular extension 21 coaxial with the hub axis through which extends the stroke adjusting shaft 17 and splined within this extension is a stroke indicator sleeve 22 in threaded engagement with the shaft and having circumferential parallel rack teeth engaged by a pinion 23 of a dial shaft 24 which is rotatable in a cap or cover 34 attached to the outer end of the hub bushing 12, closing the chamber 20. This shaft 24 has at its upper outer end a dial disk for indicating the degree of stroke adjustment.

Upon the tubular extension 21 is keyed a cam block 30 having substantially the form of an oblique cylinder with parallel faces and having a plurality of peripheral parallel V-shaped grooves 31 which are also parallel with the end faces or bases.

The peripheral contour of the grooves are herein noncircular, but their character or form may be changed to meet varying conditions of design, the object being to so form and arrange them as to obtain varying degrees of feed screw rotation and corresponding varying cross-feed of the work conformable with the amount of cut desired.

The use of a cam for the purpose herein, its design, mode of attachment, operation and function are important features of the invention, the results accomplished being cross-feed of the work during the return stroke of the ram, only and exactly during such retreat stroke. By use of a cam of this nature in conjunction with a novel arrangement of a cam actuated feed lever mounted independently at a point other than that of the crank wheel axis, the relationship of the cam roller to the cam is not changed when the work table is raised and lowered and, therefore, more accurate feed is obtained at all times. Moreover, the provision of a plurality of cams thus arranged for varying the degree of work feed eliminates the use of variable levers wherein the length of the arms is changed, or the use of devices for restricting the return movements of the cam engaging roller.

In the present device a feed lever is slidably mounted to permit the selective engagement of its roller with any one of the grooves of the cam, and the character and degree of lever motion is thereby determined entirely by cam groove formation or contour, and the relative motions of the lever by the relative successive disposition of the grooves of the cam block. Thus, the degree, character and relations of various desired cross-feed motions can be positively and selectively obtained without further adjustments of any portion of the transmission mechanism, intermediate the cam and the cross-feed screw. Moreover, if desirable, a plurality of interchangeable cam blocks may be supplied for each machine, each having a different number, arrangement and character of grooves, and each block attachable to the hub extension of the crank gear or in any other position for direct rotation thereby, this materially increasing the capacity of the machine.

Below and parallel with the crank hub and adjacent the cam block is a shaft 32 mounted in the hub bushing 12 at one end, and held at its outer end in a removable gear and transmission housing 33, in turn held in a cap plate 34 which closes the outer chamber portion of the crank wheel hub bushing. The housing 33 is rotatable within the cap 34, about the shaft 32, to permit vertical adjustment of the table. The shaft 32 is suitably machined to provide bearing surfaces, and rotatably mounted thereon is a drive bushing 35 having keyed at its inner end adjacent its bearing a ratchet wheel 36 and at its outer end a bevel gear 37. The shaft is held from rotation and cap or gear housing held in position by a nut 38 which when turned to clamping position holds the headed end of the shaft within its seat and thus prevents translative or rotative movement thereof. Rotatably mounted upon the bushing 35 is a sleeve 39 extending between the gear 37 and ratchet wheel 36 and held against translation thereby. This sleeve has a radially extending pawl arm 40 having at its extremity a tubular rearwardly disposed extension in which is rigidly held an elongated pin or stub shaft 41 axially parallel with the axis of the ratchet mechanism supporting shaft 32 and extending forwardly beneath the shaft.

Mounted rotatably and translatably upon the sleeve 39 carrying the ratchet arm 40 is an element, herein called the feed rack or laterally translatable rocker, comprising a thimble portion 42 rotatably and slidably engaged about the sleeve 39 and having two radial arms 43, 45 substantially right-angularly related relatively offset and disposed at the opposite extremities of the thimble. The horizontal arm 43 is bifurcated to form spaced arms and journaled at the outer end of and between the arms is a disk or roller 44 having in this instance a convex V-shaped periphery engageable with the corresponding concave V-shaped grooves of the cam block 30. The vertical arm 45 at its extremity has an opening slidably engaged with the stub shaft 41 the connection being in the nature of a spline whereby oscillatory movements of the feed rack are positively communicated to the ratchet sleeve, and whereby operative connection is positively maintained during selective translation of the feed rack. The rack is moreover provided with a radial arcuate extension 46 in this case diametrically opposite the disk carrying arm and this extension is provided with circumferential rack teeth 47 engageable by a suitable pinion 48 slidably keyed at the inner end of a shifting rod or shaft 49 rotatable in the housing and having keyed at its outer end a dial member graduated for registration with a mark on the casing, the graduations corresponding in number and positions to respective cam grooves, whereby upon rotating the shaft 49 by means of its handle the feed rack is appropriately translated for engaging the roller 44 with the desired cam surface or groove 31 of the cam 30. The movement of the pinion 48 upon the shifting rod is positively limited in downward direction by a cross-pin and yieldably limited in upward direction by a coil spring 50 interposed between and against the gear and the bearing of the operating rod. The feed rack can thus at all times be translated during oscillation in order to be selectively urged toward and engaged with the cam block grooves wherewith it is yieldably maintained in the following manner:

The ratchet sleeve is provided with a radial projection 52 (see Figs. 13, 14) having a spherical depression at its outer end with which is engaged the spherical head of a plunger-like element 53 providing an abutment flange 54 intermediate its length and having its other extremity provided with a spherical enlargement reciprocal in a tubular bushing 55, said bushing being removably attached in the wall of the housing. An expansion spring 56 is interposed between the flange and the bushing for forcing the plunger in a direction to yieldably maintain the disk wheel 44 in engagement with a cam block groove.

The ratchet mechanism is for the purpose of obtaining an intermittent rotary motion of the ratchet and bevel gears, positively in one direction, as the result of the oscillatory motion of the feed rack, this positive feed herein taking place as the lever moves in a downward direction indicated by the arrow in Figs. 12 and 16, the direction of the cam block rotation being indicated by an arrow in Fig. 16.

In order to obtain this intermittent feed of the gear shaft, the arm is broadened as shown in Fig. 14 and one side of the tubular extension is flattened to provide a spring socket and abutment. To this broadened portion is pivoted a spring pressed pawl 58 having terminal ratchet teeth, in this instance three in number, engageable with the teeth of the ratchet wheel 36 keyed to the driving bushing whereby as the feed rack is oscillated the driving bushing is intermittently driven in forward direction in order to correspondingly rotate the cross-feed screw. Reverse motion of the driving bushing is prevented by a plurality of lever pawls 59 mounted for oscillation upon a pivot 60 removably but firmly held in the casing and extending outwardly therefrom, said pivot having integral therewith a plate or disklike flange 61 from which projects a pin against which are engaged the ends of three springs 62 coiled about another pin projecting from the casing and having their opposite ends socketed in the non-engaging arms of the pawl. The teeth 63 of the pawls have an offset or staggered relation peripherally, the total amount of offset being equal to one tooth length of the ratchet wheel, thus obtaining constant pawl engagement without loss of motion and making for perfect intermittent ratchet drive. The arrangement of the pawl upon the pin provides a conveniently attachable and detachable unit.

Referring to the diagram of Figure 16, in which the paths of the first and last cam grooves or surfaces only are represented, corresponding to maximum and minimum cross-feed; the portions of the grooves between the points H, L correspond to the feeding stroke of the ratchet mechanism. As point H travels toward L in the direction of the arrow, the ratchet shaft is rotated in clockwise direction and the work is fed. The skewed relation of the cam grooves or surfaces is to compensate for the rotary path of the feed rack roller to preserve the proper relation between cam surfaces and roller for each position of the roller.

The motion of the ratchet sleeve 39 is transmitted to the feed screw through a driving train, including reversing mechanism mounted upon the rail, and a telescopically arranged transmission shaft connecting the ratchet mechanism with the reversing mechanism, such telescopic arrangement being necessary because of the vertical movements of the carriage. A description of the mechanism mounted on the carriage will now be given and thereafter the arrangement for transmittingly connecting the same with the ratchet mechanism.

The saddle 70 is shown mounted upon vertical ways 71 of the machine body and one form of table or carriage 72 is shown gibbed to the saddle ways. The cross-feed screw 73 is rotatably non-translatably mounted and operates in the usual manner when rotated to traverse the work table. The saddle is extended and is bored as at 74 in its outer end face concentrically with the feed screw axis. Within this bore is engaged a tubular extension 75 of a gear housing 76 to which the reversing gear housing 77 is detachably swivelled. The first housing 76 is non-rotatably attached to the saddle by screws, its configuration being best shown in Figs. 4 and 8. The housing comprises a hollow body portion having an attaching flange extending laterally therefrom. A removable cover 78 is attached to the upper side and has a depending projection 79 adapted to engage and retain a gear 80 at the extremity of the reversing driving sleeve 81 in a manner more fully described hereafter. The outer wall of the housing is provided with a circular bearing opening 82 having segmental arcuate diametrically related locking flanges 83 interiorly thereof adapted for engagement by corresponding grooves 84 formed circumferentially of a short tubular extension of the reversing mechanism housing 77, whereby the housing can be engaged with or disengaged from the first mentioned housing and locked rotatively or swiveled thereto, to permit rotative or compensative adjustment between the housings when the saddle is raised or lowered. By rotating the outer housing to an angle of 180° from the position shown in the figures, the grooves may be disengaged from the flanges and the housing can be removed. This construction provides means whereby the housing can be securely rotatably locked in operative position.

In assembling the telescopic portion of the mechanism the bearing element 76 is properly engaged with the housing by turning the same to a position in which the grooved portion of the housing may be inserted within the bore 83 after which the element 76 is rotated through an angle of approximately 180° to bring the arcuate projections into locking position within the slots. After this operation the element 76 is fastened to the saddle by screws, as shown in Fig. 8.

The reversing gearing housing 77 has a laterally substantially horizontally disposed tubular extension 85 integral therewith, into which is telescopically fitted a corresponding tubular extension 86 of the gear housing 33, and each extension is suitably machined to provide internal bearing surfaces for journaling correspondingly telescopically related transmission elements, one a shaft and the other a sleeve. This telescopic arrangement allows the extension of the transmission elements when the saddle is raised or lowered from a mid-position in which the connecting elements are in a horizontal position and the extension 85 is provided with means for suitably adjusting the degree of friction between the telescopic sections.

The cross-feed shaft 73 is journaled in the saddle and adjacent one end is castellated as at 88 the shaft being shouldered as at 89 at one end of the castellations by counterturning. Upon this counterturned portion is slidably mounted the driving sleeve 81 having the terminal spur gear 80 at its inner end provided with radial slots 90 in its outer face engageable with the castellations to lock the sleeve for rotation with the shaft under ordinary conditions. The finger or projection of the housing cover acts to prevent translative disengagement of the sleeve from the shaft castellations. When, however, the cover is removed the sleeve can be translated outwardly to disengage the grooves from the shaft castellations for certain purposes, one of which is to interrupt transmission connection between the crank shaft and the cross-feed screw. The sleeve may however be non-translatably keyed to the feed shaft in the ordinary manner.

Splined midway of the sleeve is a reversing clutch element 92 adapted for alternate clutch engagement with bevel gears 93, 94, rotatably mounted upon the sleeve and constantly in mesh with a driving gear 95 keyed to a tubular sleeve having an enlarged chamber-like extension 97 at the opposite side of its bearing for the attachment and housing of a safety clutch described hereafter.

The clutch collar 92 is centrally grooved and has engaged therewith a pin at one end of the shifter lever 98 (see Figs. 3 to 7 inclusive) centrally pivoted to the bottom of the housing. The opposite end of this lever is slotted to provide fingers and engaged between the fingers is an eccentrically disposed pin 100 projecting downwardly from a vertically disposed shifter shaft 101 journaled in the housing and having its operating handle at its upper end. In order to lock the shaft in positions corresponding to forward, reverse and neutral positions of the clutch the same near its bottom end is provided with three grooves 102 corresponding to the three positions of the clutch collar and engaged with these grooves is a spring pressed ball detent 103 translatably and removably held in the bore of the housing. Suitable marks may be provided upon the upper end of the operating shaft registerable with a mark on the housing to indicate the various positions of the clutch member.

The feed shaft 73 extends beyond the housing and is counter-turned and squared to provide a wrench engaging surface by which means the shaft may be manually rotated. The shaft is shouldered as at 104 and has pinned thereto a retaining sleeve 105 engaged against the shoulder and outer face of the housing, and upon the sleeve is adjustably, rotatably mounted a dial 106 which may be set in any desired angular relation to the shaft and locked in said position by the screw 107. The dial is peripherally graduated, said graduations being registerable with a mark on the housing.

Driving connection between the sleeve 96 and the gear 37 of the ratchet mechanism is provided by the shaft 108 mounted in the extension 86 of the gear housing cap 33, and having a bevel gear 109 in mesh with the bevel gear 37. This shaft is provided with keyways 110 at its other end and is translatably disposed within the bushing or sleeve 96. Slidably keyed to the shaft by means of the keyways are a plurality of friction disks 111 alternating with similar disks 112 slidably keyed within the enlarged or chambered portion 97 of the sleeve. The disks are held from translative movement within the sleeve by a nut 113 having threaded engagement with the sleeve and an expansion spring 114 surrounds the shaft and is interposed between the end disk and the sleeve shoulder or end wall 115 to exert a predetermined pressure upon the disk sufficiently only to maintain driving connection for ordinary transmission strains but adapted to permit slippage of the clutch disks upon one another when undue strains are put upon the transmission mechanism.

It will also be noted that by arranging the feed rack 42 and ratchet driven sleeve 39 upon an axis other than the crank wheel axis, and by having a swiveled transmission connection between the sleeve and carriage, the relation of the feed rack to the cam is not disturbed by vertical movements of the saddle and therefore no compensative adjustments for this purpose are necessary as is the case of machines now in use.

Having described my invention, I claim:

1. In a metal shaping machine, a ram, a crank gear therefor, a carriage cross-feed screw, a multiple cam rotatable with said crank gear, a ratchet feed transmission mechanism connecting said cam and cross-feed screw including a rocker member engaging said cam, and laterally translatable across said cam for selective engagement with the various cam surfaces, to obtain the varying degrees of feed screw rotation in synchronism with the ram.

2. In a metal shaping machine, a ram, a crank gear therefor, having a hub extension, a multiple cam rotatable with said extension, having cam surfaces eccentric to the crank gear axis, a carriage cross-feed screw intermittently operable transmission mechanism connecting said cam and cross-feed screw including a rocker member engaging said cam and laterally translatable across said cam for selective engagement with the various cam surfaces to obtain varying degrees of feed screw motion in synchronism with the ram.

3. In a metal shaping machine, a ram, a crank gear therefor, a carriage cross-feed screw, a multiple cam rotatable with said gear and transmission mechanism connecting said cam and cross-feed screw, including a rocking element adapted when oscillated to intermittently drive said transmission mechanism in forward direction, and laterally adjustable for selective engagement with the various cam surfaces to obtain varying degrees of feed screw motion in synchronism with the ram.

4. In a device of the class described, a ram, a crank gear operatively connected therewith, a multiple cam movable in unison with the crank gear having a plurality of cam surfaces of varying contour, a rocker member adapted to be laterally translated for engagement with a selected cam surface of said cam for oscillation thereby, a cross-feed screw shaft, and transmission ratchet mechanism transmittingly connecting with said screw shaft said ratchet mechanism operable by said rocker member to obtain positive feed rotation of the shaft, when the rocker member is oscillating in one direction by any cam surface.

5. In a device of the class described, a ram, a crank gear therefor, a cam movable in unison with the crank gear, having a plurality of cam faces, a rocker member laterally adjustable for selective engagement with the cam surfaces for oscillation thereby, a cross-feed shaft and intermittently operable transmission ratchet mechanism transmittingly connecting with said shaft said ratchet mechanism operable by said rocker member to obtain positive feed rotation of the shaft when the rocker member is oscillated in one direction by any cam surface.

6. In a device of the class described, a ram, a crank gear operatively connected therewith, a cam movable in unison with the gear having a plurality of cam surfaces of varying contour, a rocker member laterally translatable for selective engagement with the cam surfaces for oscillation thereby, a cross-feed screw shaft, a reversing mechanism therefor, and a transmission ratchet mechanism connecting said reversing mechanism with said rocker member and operable by said rocker member to obtain positive feed rotation of the screw shaft when the rocker member is oscillated in one direction by any cam surface.

7. In a device of the class described, a ram, a crank gear operatively connected therewith, a carriage cross feed screw, a cam rotatable in unison with the crank gear having a plurality of circumferential cam surfaces of varying contour and eccentric to the crank gear axis, a rocker member independently mounted, adapted to be selectively translated axially of the cam for engagement with its surfaces for oscillating the rocker member, a cross-feed shaft transmission ratchet mechanism transmittingly connecting with said cross feed screw and operable by said rocker member to obtain positive feed rotation of the screw when said rocker member is oscillated in one direction by any cam surface.

8. In a device of the class described, a ram, a crank gear operatively connected therewith, a cam movable in unison with the crank gear having a plurality of circumferential parallel cam surfaces of varying contour and eccentric to the crank gear axis, a rocker member adapted to be selectively translated axially of the cam for engagement with the cam surfaces for oscillating the rocker member, a cross-feed screw and transmission ratchet mechanism connecting with said screw and operable by said rocker member to obtain positive feed rotation of the screw when said rocker member is oscillated in one direction by any cam surface.

9. In a metal shaping machine including a ram, a crank gear in operative connection therewith, a carriage cross-feed screw, a cam rotatable with said crank gear having a plurality of parallel peripheral cam grooves of irregular contour and eccentric to the crank gear axis, a ratchet transmission mechanism including a rocker member having a roller thereon adapted for selective engagement with the grooves of the cam, and further adapted when oscillated in one direction to obtain positive feeding action of the transmission mechanism for operating the feed screw.

10. In a device of the class described, a feed screw, a ram, a crank gear operatively connected with said ram, a multiple cam rotatable with the gear, a stationary shaft, a sleeve rotatable thereon having a ratchet wheel and a gear keyed thereto, a second sleeve rotatable upon said first sleeve having a feed pawl engageable with said ratchet wheel, a second pawl for preventing reverse sleeve movement, a rocker member slidable upon said second sleeve adapted to rock thereon, said rocker member selectively engageable with the surfaces of said cam for rocking the rocker member, an element slidably connecting said rocker member and second sleeve whereby said sleeve is rotatably oscillated with said rocker member and whereby said connection is maintained at all positions of the rocker member, and transmission mechanism connecting the gear of said first sleeve with said feed screw.

11. In a device of the class described, a crank gear, a cam element movable in unison therewith having a plurality of circumferential cam faces of varying contour, a rotatably mounted transmission element, a rocker member pivoted thereto and slidable thereon adapted to engage with any face of said cam, ratchet mechanism connecting said rocker member and rotatable element for procuring positive intermittent rotation in one direction when said rocker member is oscillated, a cross-feed screw, and transmission mechanism connecting said rotatable element with said feed screw.

12. In a shaper, a table carrying cross rail, a table cross feed shaft, a driving shaft parallel with the cross feed shaft, a sectional shaft in geared connection with said cross feed and driving shafts, and compressively engaged friction disks for transmittingly connecting the sections of said sectional shaft and automatically releasing the transmitting connection under excessive counter torque strains of said sections.

In witness whereof, I hereunto subscribe my name.

ROBERT T. HAZELTON.